(12) United States Patent
Frank

(10) Patent No.: US 7,093,484 B2
(45) Date of Patent: Aug. 22, 2006

(54) CALIBRATING DEVICE FOR A WATER METER

(75) Inventor: Roger Frank, Zeiskam (DE)

(73) Assignee: Elster Messtechnik GmbH, Lampertheim (DE)

( * ) Notice: Subject to any disclaimer, the term of this patent is extended or adjusted under 35 U.S.C. 154(b) by 0 days.

(21) Appl. No.: 11/039,023

(22) Filed: Jan. 20, 2005

(65) Prior Publication Data
US 2005/0155423 A1    Jul. 21, 2005

(30) Foreign Application Priority Data
Jan. 20, 2004    (DE) ................ 10 2004 003 046

(51) Int. Cl.
*G01F 3/08*    (2006.01)
*G01F 3/12*    (2006.01)
(52) U.S. Cl. .......................... 73/253; 73/258
(58) Field of Classification Search ............ 73/253, 73/258
See application file for complete search history.

(56) References Cited
U.S. PATENT DOCUMENTS
1,887,400 A * 11/1932 Dayton ................ 73/254
1,888,369 A * 11/1932 Bassett ................ 73/254

FOREIGN PATENT DOCUMENTS
WO    03/093772 A1    11/2003

* cited by examiner

*Primary Examiner*—Harshad Patel
(74) *Attorney, Agent, or Firm*—Laurence A. Greenberg; Werner H. Stemer; Ralph E. Locher

(57) ABSTRACT

A water meter has a measurement insert disposed in a meter housing, a measurement display, an intake connection and a discharge connection. An impeller is disposed on a shaft in a measurement insert housing, also referred to as impeller bowl. A first shaft end of the shaft interacts with the measurement display. The meter housing has, on a side facing away from the first shaft end, referred to as a lower side below, recesses or openings for receiving fasteners for fastening a cover, and a calibrating device for adjusting the measurement display. The calibrating device is inserted into at least one of the openings that can be closed by the cover.

8 Claims, 4 Drawing Sheets

CALIBRATING DEVICE FOR A WATER METER

BACKGROUND OF THE INVENTION

Field of the Invention

The invention relates to a multi-jet water meter that is configured, in particular, as a wet running meter or dry running meter. The water meter has a measurement insert disposed in a meter housing, a measurement display, an intake connection, and a discharge connection. An impeller is disposed on a shaft disposed in the measurement insert housing, also referred to as impeller bowl. A first shaft end of the shaft interacts with the measurement display. The meter housing has, on the side facing away from the first shaft end, recesses which are assigned to a cover.

Conventional multi-jet water meters contain a meter housing, which is usually configured as a cast housing and in which a measurement insert with an impeller and impeller bowl is disposed. The water flows through an intake connection into the cast housing forming the measurement space, flows through the measurement insert and leaves the housing through a discharge connection. In this case, the measurement insert is pressed in a sealing manner onto a housing seat situated in the cast housing, so that creeping water cannot flow past the measurement insert.

On account of the configuration of the meter, the meter housing of the water meter is usually produced from cast brass or cast bronze, the quality of the configuration of the cast housing, in particular its surface roughness, having a decisive effect on the measuring result.

In addition, mechanical refinishing of the cast housing is imperative in order to bring the threads, cutouts, contours, regions and the housing seat, which require an exacting manufacturing tolerance and/or a surface with little roughness, to the required level of quality.

The measurement insert for the multi-jet water meters configured as wet running meters and most dry running multi-jet water meters are usually fitted into the housing on that side of the meter, referred to below as the upper side, on which the measurement display can be read.

In a further embodiment of a dry running meter, the measurement insert is fitted into the meter housing on the side facing away from the measurement display, referred to below as the lower side.

Both during casting and during machining in series manufacturing, inaccuracies, such as, for example, shrink holes and burrs, which have a negative effect on the measuring result of the water meter in particular on the lower side of the housing seat in the region of the inlet ducts of the impeller bowl, cannot be avoided.

Before the water meter is installed into a water conduit network, the water meter is adjusted by a calibrating device. In this case, a bypass opening is enlarged or reduced in size. In a further variant embodiment, the build-up of water in the measurement insert is changed, for example by rotating or displacing retaining ribs, as a result of which the speed of the impeller is changed and therefore the meter is calibrated. In order to prevent manipulations to the measurement display, the calibrating device is usually nonreleasably protected against rotation usually by bonding or welding or by a seal, and can be rotated only by being destroyed.

Other influences which affect the measurement accuracy of the water meter include solids which are transported in the water conduits and may affect the measuring elements of the water meter or may even damage the latter. In order to minimize these influences, a strainer for retaining the solids is installed in the water meter. The strainer is either disposed in the intake connection in the form of a "finger-type strainer" or is disposed around the impeller bowl of the measurement insert in the form of a "basket strainer".

The use of a basket strainer that at the same time fixes the measurement insert in the housing results in measuring inaccuracies, since, when the meter is extremely dirty, the flow speed increases and the measuring result is thus falsified. As a result, the strainer has to be frequently exchanged. In order to exchange the basket strainer, the entire measurement insert has to be removed from the meter housing and re-inserted. After it has been re-installed in the meter housing, the meter has to be tested again in order to ensure that the measurement will be correct.

SUMMARY OF THE INVENTION

It is accordingly an object of the invention to provide a calibrating device for a water meter that overcomes the above-mentioned disadvantages of the prior art devices of this general type, in which particular influences of the meter housing on the measuring result, are avoided.

The water meter according to the invention, which is preferably configured as a wet running meter or dry running meter, contains a measurement insert, which is disposed in a meter housing. The water meter further has a measurement insert housing, a measurement display, an intake connection and a discharge connection. An impeller is disposed on a shaft in the measurement insert housing, also referred to as an impeller bowl. A first shaft end of the shaft interacts with the measurement display. A supporting part is disposed between the meter housing and the measurement insert housing. The supporting part, which is preferably configured as a plastic part, absorbs the forces acting in the axial direction of a second shaft end of the shaft through the measurement insert housing and conducts these forces into the meter housing.

The meter housing has, on the side facing away from the first shaft end, referred to below as the lower side, recesses or openings for receiving fasteners for fastening a cover. A calibrating device is disposed in at least one of the recesses and is concealed on the meter housing by the cover, by fasteners that interact with further recesses.

An impeller is disposed on a shaft in the measurement insert housing, also referred to as an impeller bowl, and the first shaft end interacts with the measurement display. A supporting part, which is preferably a plastic part, is disposed between the meter housing and the measurement insert housing. The supporting part absorbs the forces on the measurement insert housing, which forces act in the axial direction of a second shaft end of the shaft, and conducts the forces into the meter housing.

According to the invention, the seat of the measurement insert is formed by the plastic part, also referred to as plastic housing, which forms a space, also described below as an annular space, around the impeller bowl.

The configuration of the measurement insert seat as a plastic housing results in an improved surface roughness in the space around the measurement insert by burrs which are caused by production and occur, for example, in the case of cast housings being avoided.

In a first embodiment, the plastic housing is supported on the meter housing in such a manner that the housing seat is sealed axially, for example by a seat seal.

In a second embodiment, the plastic housing is placed onto the meter housing, the housing seat being sealed radially, for example by a seat seal, and being supported on a formation which is incorporated in the cast housing and is preferably configured as a ring. A flow is therefore formed within the plastic housing around the impeller bowl and an annular flow, which is separated therefrom, is formed on the outside of the plastic housing. Given suitable positioning, a bypass calibrating device can have the annular flow flowing against it in a reaction-free manner.

In one advantageous development, the plastic housing may also be attached directly to the impeller bowl, in particular molded on, thus rendering an additional sealing point superfluous.

During the assembly of the meter housing, which is preferably configured as a metallic cast housing, the measurement insert is fitted through the opening, which can be closed by the covering plate, as a result of which the plastic housing advantageously also fixes the measurement insert against the lower side.

In contrast to the configuration of the space around the measurement insert in the cast housing, the configuration of the annular space around the measurement insert entirely as a plastic housing, also described below as a measurement chamber, results in a more precise production of the required threads, cutouts, contours, regions and of the housing seat of the measurement chamber, as a result of which the measuring accuracy of the water meter is significantly increased and the influence of the quality of casting or surface roughness of the meter housing on the measuring result can be made negligible.

In one particularly advantageous embodiment of the invention, a baffle wall, which conducts that part of the water which acts upon the impeller substantially through the lower part of the measurement chamber, is integrated into the plastic housing, thus additionally reducing further influences of the meter housing.

In a further advantageous embodiment of the invention, the baffle wall is attached directly to the measurement insert.

The installation of the plastic housing into the meter housing of the water meter and the use of the plastic housing as a space around the measurement insert, in addition to the substantially more accurate measuring results, also reduces the straggling of the error curve which arises in the case of the production of large manufacturing lots.

For calibration purposes, the water meter according to the invention has, on the discharge connection of the meter housing, the calibrating device through which some of the water flow, the "bypass water", flows bypassing the measuring vanes of the impeller, i.e. the water flowing on the approach side is guided separately as bypass water and water to be measured. The bypass water is therefore shielded by the plastic housing from the actual measurement space, as a result of which the bypass has no reaction on the actual measurement space, and the calibration can be carried out in a reaction-free manner.

The calibrating device contains a rotatable regulating cylinder which projects into a regulating opening and, upon rotation, enlarges or reduces the size of a passage opening for the bypass water and therefore varies the throughflow rate per unit of time within the passage opening.

Owing to the fact that the calibration device, after the meter housing is closed with the covering, is no longer visible and accessible from the outside, manipulations to the calibrating device are avoided and a recalibration which may be needed after maintenance work can be carried out in a simple manner, since the calibrating device, after removal of the fastening screw, can be used without any further intervention for a recalibrating process.

According to one advantageous development of the water meter according to the invention, the basket strainer, which has hitherto conventionally been placed onto the lower part of the measurement insert and is intended for filtering impurities, is replaced by a finger-type strainer or plug-in strainer which can be exchanged in a simple manner and is inserted into the intake connection.

Other features which are considered as characteristic for the invention are set forth in the appended claims.

Although the invention is illustrated and described herein as embodied in a calibrating device for a water meter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
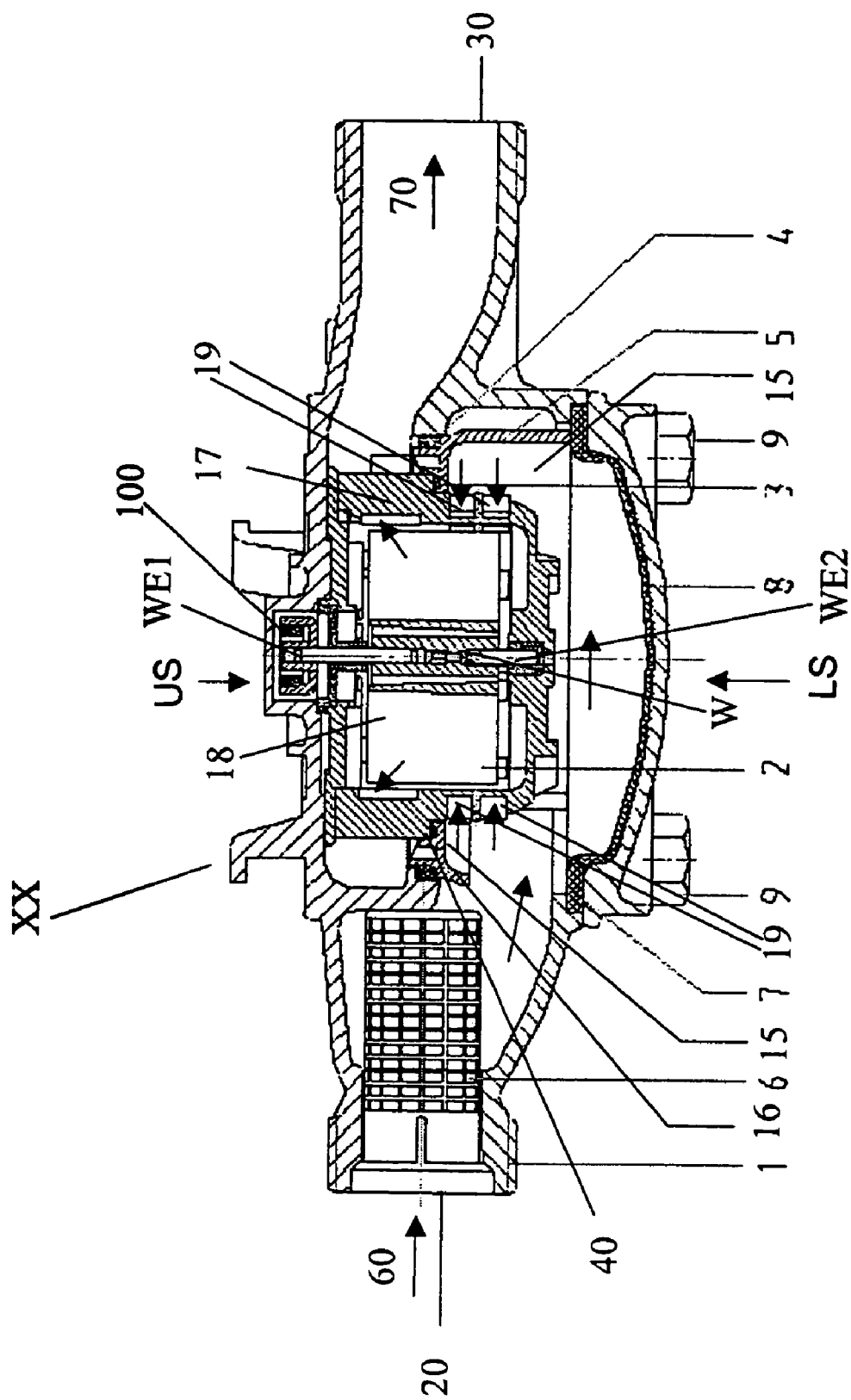
FIG. 1 is a diagrammatic view of an embodiment of a water meter according to the invention shown laterally in section from a perspective seen transversely with respect to a through flow direction.
Figure 2:
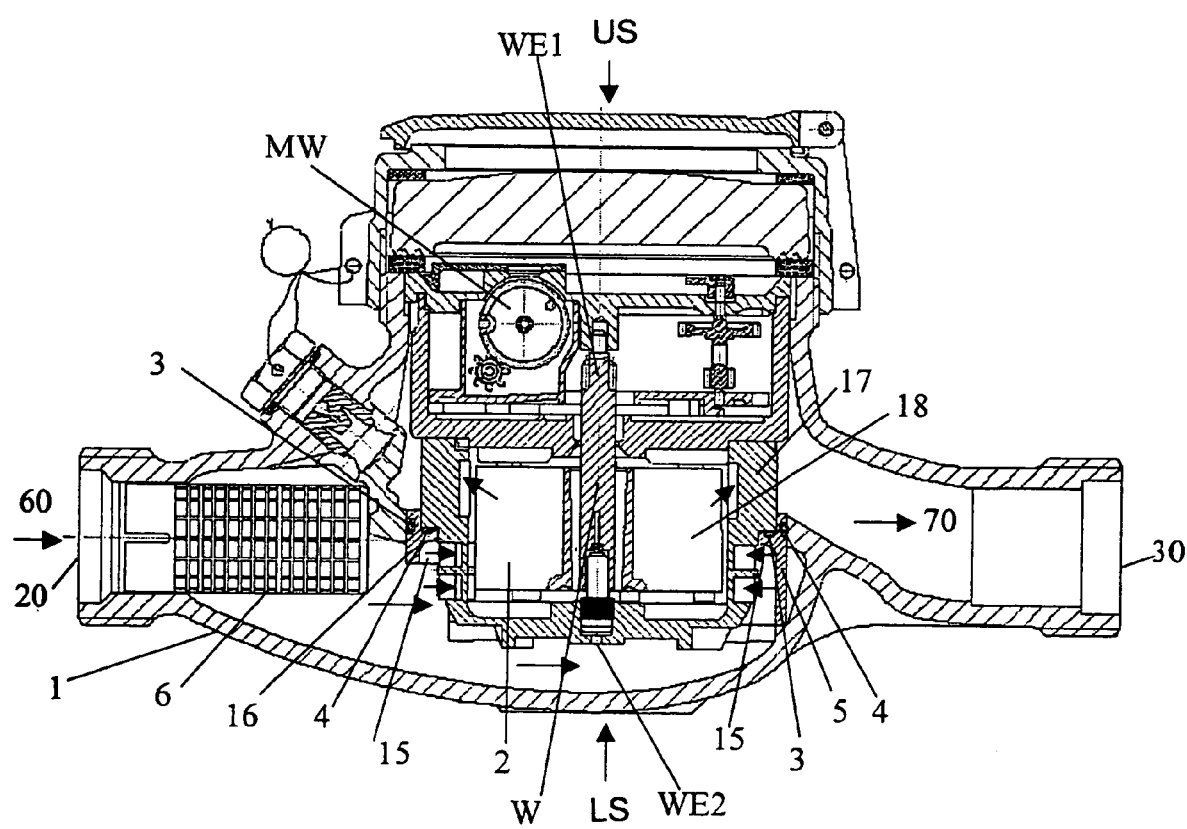
FIG. 2 is a view of a further embodiment of the water meter according to the invention shown laterally in section from a perspective seen transversely with respect to the through flow direction.

Referring now to the figures of the drawing in detail and first, particularly, to FIGS. 1 and 2 thereof, there is shown a water meter which is known per se and has a T-shaped meter housing 1 which is configured as a metallic cast housing. The water meter has an intake connection 20 into which inflowing water 60 is fed and a discharge connection 30 out of which the outflowing water 70 flows out. The water meter also has a measurement insert 2 which contains an impeller 18 and an impeller bowl 17, also referred to as a measurement insert housing, which is inserted into the meter housing 1 in such a manner that an annular space 15 is formed around the measurement insert 2.

The impeller 18 is disposed on a shaft W and a first shaft end WE1 interacts with a measurement display.

The meter housing 1 has, on its upper side US, illustrated in FIG. 1, a device 100 for fastening a non-illustrated measuring mechanism to a display device which is driven by a magnetic coupling, and, on a lower side LS illustrated in FIG. 1, a further opening for the insertion of the measurement insert 2.

The opening on the lower side LS of the meter housing 1 of the embodiment, illustrated in FIG. 1, of the water meter according to the invention is closed by a covering 8, by four screws 9, 12. The covering 8 is preferably made of the same material as the meter housing 1 and is made, for example, of cast bronze, plastic or grey cast iron in accordance with the particular requirement. The sealing of the meter housing 1 to the outside takes place in a conventional manner by a seal 7 which is compressed by that side of the bottom plate or cover 8 which faces the interior of the meter housing 1.

The connections 20, 30 are used to install the water meter into a water conduit network, so that, in the process of water passing through, the particular quantity of water used is determined in the measurement insert 2 and is recorded by a measurement display MW, also referred to as a measurement mechanism. The measurement mechanism MW is illustrated by way of example in FIG. 2 and is not described further, since it has virtually no significance for the present invention.

A supporting part 5, which is configured as a plastic housing, is inserted into the meter housing 1 on the lower side LS, the seat of the measurement insert 2 being formed, according to the invention, by the plastic housing 5, also referred to as plastic part, which at the same time forms the annular space 15 around the impeller bowl 17.

The plastic part 5 absorbs the forces on the measurement insert housing 17, which forces act in the axial direction of a second shaft end WE2 of the shaft W, and conducts the forces into the meter housing 1.

The plastic housing 5 is supported on the meter housing 1 in such a manner that the housing seat is sealed off axially with respect to the meter housing 1 by a seat seal 3 and radially with respect to the measurement mechanism MW by a further seat seal 4.

During the assembly of the meter housing 1, the measurement insert 2 and the plastic housing 5 can be fitted from the side which faces away from the first shaft end WE1, also referred to as the lower side LS, as a result of which the plastic housing 5 fixes the measurement insert 2 against the side facing the measurement mechanism MW.

The plastic housing 5, also referred to below as a measurement chamber, is formed from a tubular basic body having an opening for the water which flows around the impeller 18 and which is to be measured, and a retaining flange, which is situated on the basic body, for fastening the measurement chamber 5 in the meter housing 1.

The circumferential surface of the measurement chamber 5 is configured in a region facing the inflow side of the water as a baffle wall 16 which conducts that part of the inflowing water 60 which acts directly upon the impeller 18 substantially through the lower part of the annular space 15, since the upper part is covered by the baffle wall 16, as a result of which undesired effects of the flow in the inflow part of the meter housing 1 are additionally reduced.

The measurement chamber 5 accommodates the measurement insert 2 in its inner region. For this purpose, the measurement insert 2 has an encircling cutout 40 on which the measurement chamber 5 sits.

In order to filter impurities, a finger-type strainer or plug-in strainer 6, which can be exchanged in a simple manner, is pushed into the intake connection 20 of the meter housing 1 as far as a formation situated in the meter housing 1. The configuration of the finger-type strainer 6 results in that it can be easily removed from the inlet connecting branch.

In a further embodiment of the water meter according to the invention, which FIG. 2 shows, the plastic housing 5 is attached on the meter housing 1 in such a manner that the housing seat is sealed radially and axially.

In this case, the plastic housing 5 is supported on the meter housing 1 in such a manner that the housing seat is sealed off radially with respect to the meter housing 1 by the further seat seal 4 and axially with respect to the measurement mechanism MW by the seat seal 3.

Figure 3:
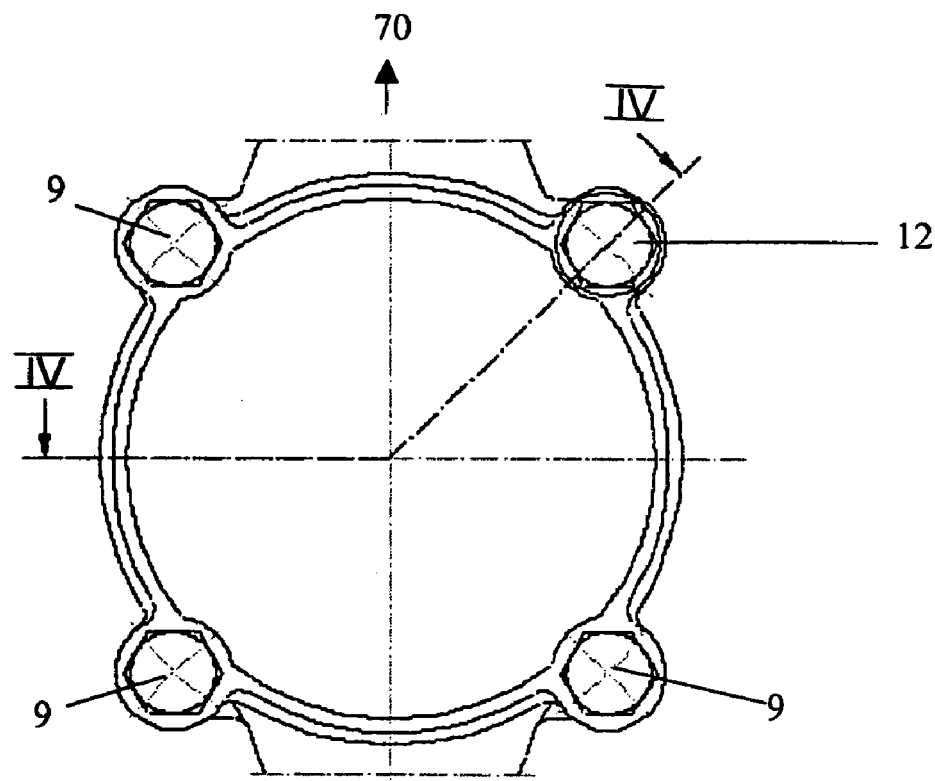
FIG. 3 is a plan view of a bottom plate as seen from the lower side of the water meter according to the invention.

FIG. 3 shows a plan view from the outside of the bottom plate 8 by which the water meter according to the invention is closed and sealed off to the outside. The screws 9, 12 used are configured in such a manner that three screws 9 are sufficient for the pressure-tight closing of the meter housing 1 to the bottom plate 8. The fourth screw 12, which is situated on the discharge connection and is also referred to as a fastening screw, closes a calibrating device 10 by a radial seal 11, which is illustrated in FIG. 4.

Figure 4:
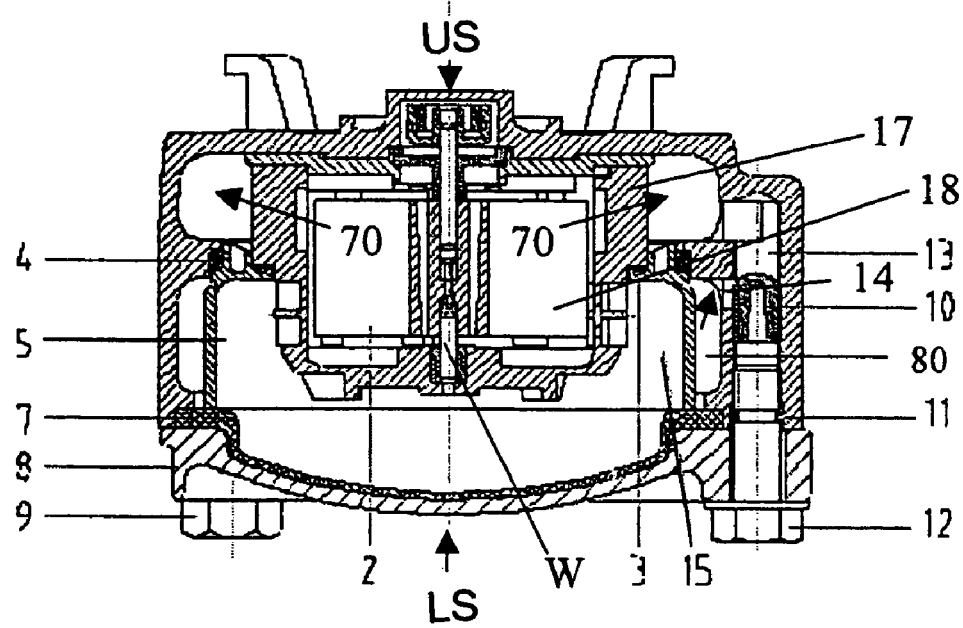
FIG. 4 is a longitudinal section view of an embodiment of the water meter according to the invention taken along the section line IV—IV shown in FIG. 3.

The longitudinal section, which is illustrated in FIG. 4, of the embodiment of the water meter according to the invention corresponding to the section line IV—IV shown in FIG. 3 shows a passage opening 14 formed in the meter housing 1, also referred to as bypass opening, which is formed by two depressions below and above the housing seat, which depressions are connected by a bore. Some of the water flow, the "bypass water", flows through the passage opening 14 bypassing the measuring vanes of the impeller 18. The flow therefore flows around the outside of the basic body of the plastic housing 5 outside the annular space 15, as a result of which the display of the measurement display can be adjusted.

To calibrate the bypass water, the calibrating device 10, which is configured as a regulating stopcock is inserted into an opening which receives the screws 9, 12 of the covering 8 and is provided with a screw thread, it being possible for the calibrating device 10 to be screwed into a regulating opening 13 connected to the bypass opening 14.

The fastening screw 12 for covering the calibrating device 10 is preferably situated on the side of the discharge connection 30, thus preventing a reaction of the bypass water BW and the actual measurement space, and the calibration can be carried out in a reaction-free manner.

In order to calibrate the quantity of water passing through the bypass opening 14, the regulating stopcock 10 is configured such that it can be rotated about the axis of rotation of the fastening screw 12, as a result of which it is possible to vary the free cross section of the bypass opening 14 that is connected to the regulating opening 13. However, the regulating stopcock 10 may also be guided in a thread, it being possible for the free cross section to be changed by the longitudinal displacement of the regulating stopcock 10 along the thread axis.

After calibration has taken place, the calibrating device 10 is covered by the fastening screw 12 and the radial seal 11, in such a manner that it is no longer visible and accessible from the outside once the water meter has been commissioned. Manipulations to the calibrating device 10 can therefore be avoided and a recalibration which may be needed after maintenance work can be carried out in a simple manner, since the calibrating device 10, after removal of the fastening screw 12, can be used without any further intervention for a recalibrating process.

The outwardly visible head of the fastening screw 12 which covers the calibrating device 10 cannot be distinguished visually from the screws 9 on the outside of the covering, i.e. is configured such that it is visually the same as the other fastening screws 9 from the outside of the covering 8, so that, after the covering 8 has been fastened by the screws 9, 12, it cannot be seen in which screw thread the calibrating stopcock 10 is disposed.

Figure 5:
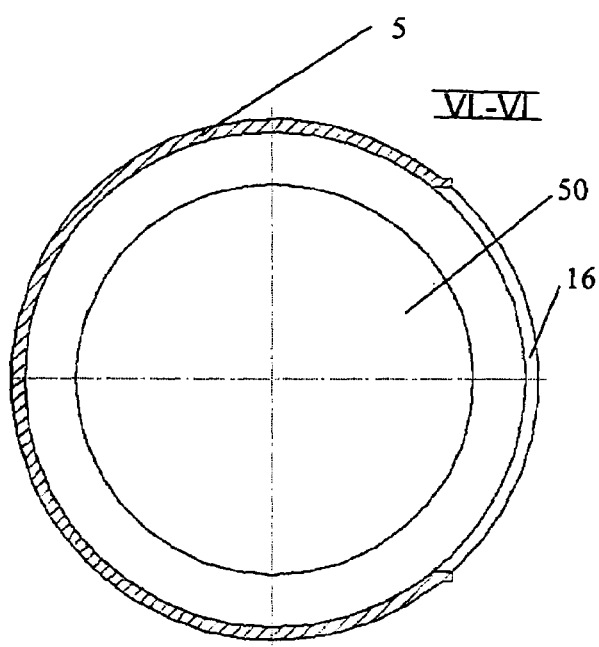
FIG. 5 is a sectional view taken along section line V—V shown in FIG. 6 with the plastic housing seen from the lower side of the water meter according to the invention.
Figure 6:
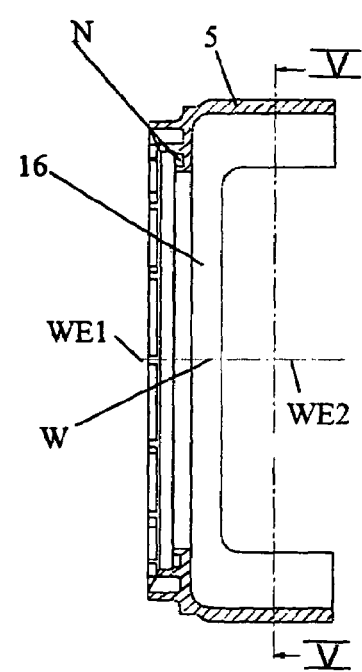
FIG. 6 is a longitudinal sectional view of an embodiment of the measurement chamber of the water meter according to the invention in a sectioned region taken along section line VI—VI shown in FIG. 5.

FIG. 5 shows a sectional view according to section line V-V shown in FIG. 6 of the plastic housing 5 with its tubular basic body and an opening 50 for the water to be conducted to the impeller 18 and to be measured, is seen from the lower side LS of the water meter according to the invention.

The baffle wall 16, which is described above in FIG. 1 and is shown in this illustration in the form of an annular section, is integrally formed on the inner circumferential surface of the plastic housing 5 and conducts the water that is to be measured essentially through the lower part of the annular space 15.

FIG. 6 shows a longitudinal section through an embodiment of the measurement chamber 5 of the water meter according to the invention along the sectioned region corresponding to the section line VI—VI shown in FIG. 5.

FIG. 6 illustrates, in addition to the inlet opening 50 for the water to be measured, also a groove N which accommodates an O-ring for the axial sealing of the measurement insert 2, and an outer surface A which accommodates the further seal 4 for radially sealing the plastic housing 5 with respect to the meter housing 1.

This application claims the priority, under 35 U.S.C. § 119, of German patent application No. 10 2004 003 046.4, filed Jan. 20, 2004; the entire disclosure of the prior application is herewith incorporated by reference.

I claim:

1. A water meter, comprising:
   a meter housing;
   a measurement insert disposed in said meter housing;
   a measurement display disposed in said meter housing;
   an intake connection extending from said meter housing;
   a discharge connection extending from said meter housing;
   a measurement insert housing disposed in said meter housing;
   a shaft disposed in said measurement insert housing, said shaft having a shaft end interacting with said measurement display,
   an impeller disposed on said shaft in said measurement insert housing;
   said meter housing having, on a side facing away from said shaft end, recesses formed therein;
   a cover;
   fasteners;
   a calibrating device disposed in at least one of said recesses;
   said cover attached to said meter housing by said fasteners which interact with further ones of said recesses; and
   a fastening screw covering and/or protecting said calibrating device, said calibrating device being protected and sealed from external interventions after fastening said cover.

2. The water meter according to claim 1, wherein said fastening screw has a radial seal.

3. The water meter according to claim 1, wherein said calibrating device, for reaction-free calibration of said measurement insert, is disposed on said discharge connection.

4. The water meter according to claim 1, wherein:
   said meter housing has a passage opening formed therein for receiving bypass water; and
   said recess in which said calibrating device is disposed defines a regulating opening communicating with said passage opening, by moving said calibrating device in said regulating opening, said calibrating device changing a diameter of said passage opening communicating with said regulating opening.

5. The water meter according to claim 1, wherein said meter housing has, in said intake connection, a formation for receiving a strainer.

6. The water meter according to claim 1, wherein said meter housing is a cast housing.

7. The water meter according to claim 6, wherein said cast housing is formed from cast brass or cast bronze.

8. The water meter according to claim 1, wherein said meter housing has, in said intake connection, a formation for receiving a finger-type strainer.

* * * * *